Figure 1:
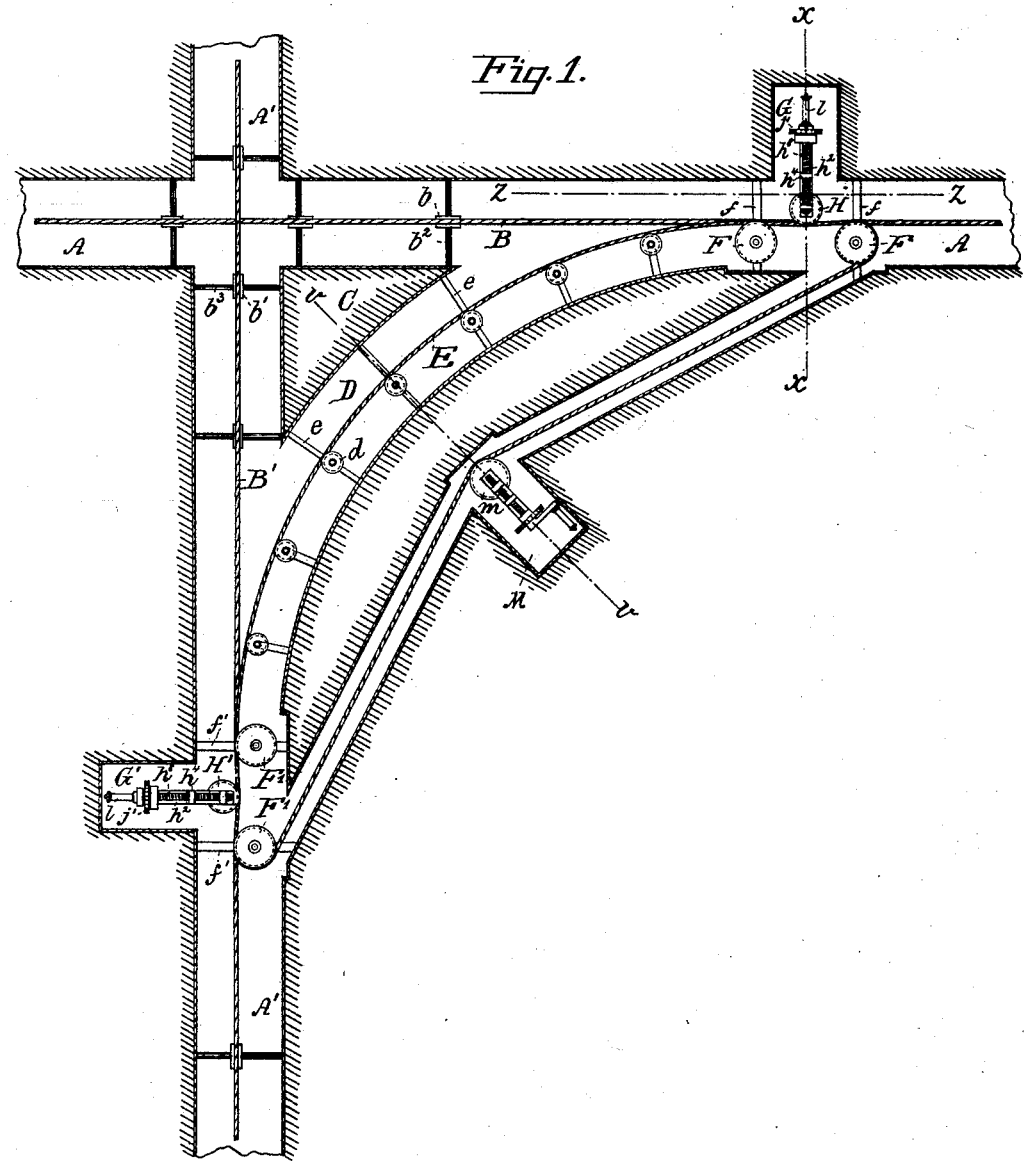

(No Model.) 3 Sheets—Sheet 1.

R. S. BELISLE.
MEANS FOR TRANSMITTING POWER IN CABLE RAILWAYS.

No. 363,576. Patented May 24, 1887.

WITNESSES.
Hermann Bormann.
Thomas M. Smith.

INVENTOR.
Robert S. Belisle,
by J. Walter Douglass,
Atty.

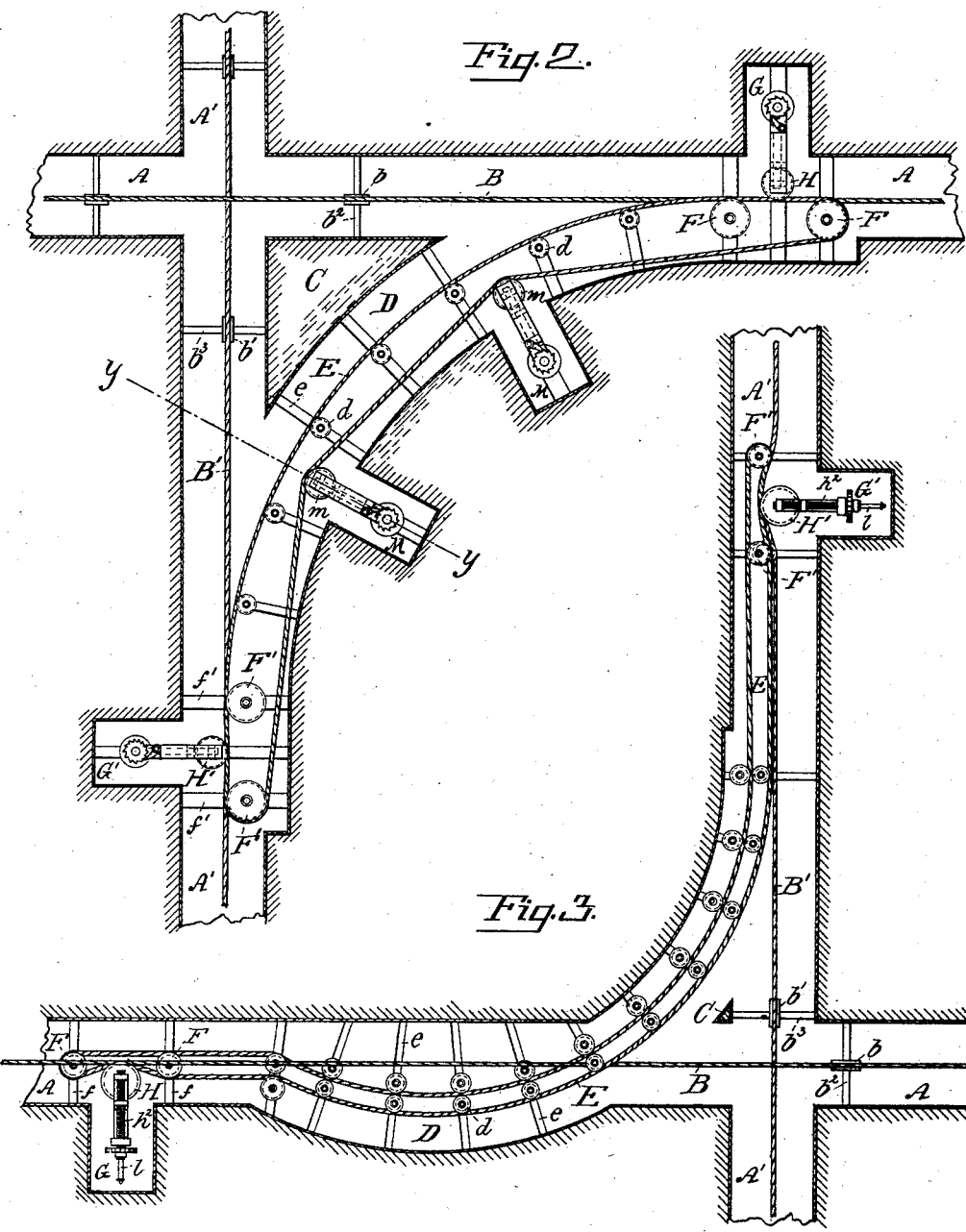

(No Model.) 3 Sheets—Sheet 3.
R. S. BELISLE.
MEANS FOR TRANSMITTING POWER IN CABLE RAILWAYS.
No. 363,576. Patented May 24, 1887.
Fig. 4.
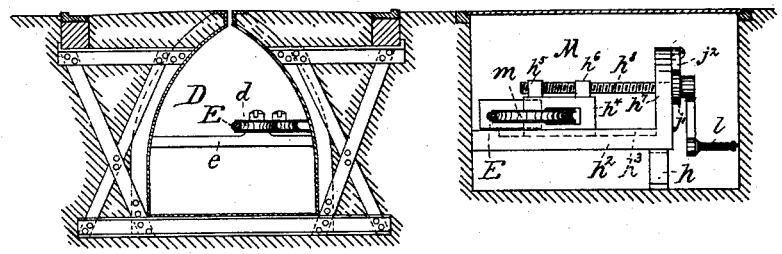
Fig. 5. Fig. 6.
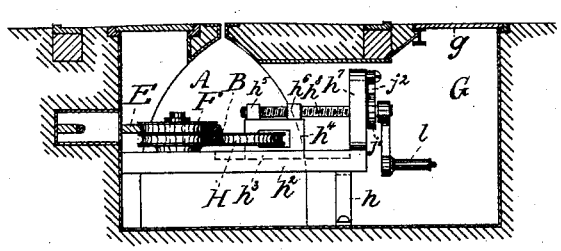 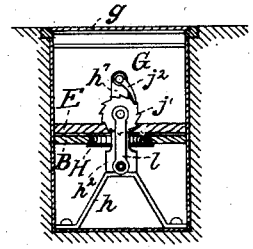
Fig. 7. Fig. 8.
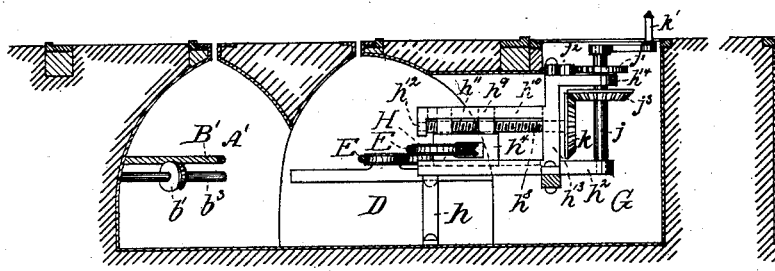 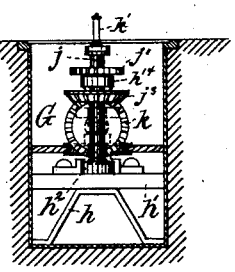
Fig. 9.
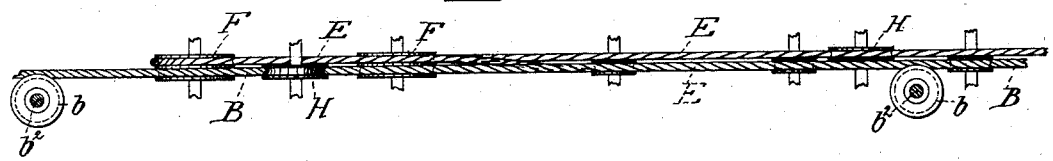
WITNESSES:
Hermann Bormann
Thomas M. Smith
INVENTOR:
Robert S. Belisle,
by J. Walter Douglass
Atty.

UNITED STATES PATENT OFFICE.

ROBERT S. BELISLE, OF PHILADELPHIA, PENNSYLVANIA, ASSIGNOR OF THREE-FOURTHS TO EDWARD Z. COLLINGS, WILLIAM H. McGRATH, AND LEWIS H. TAYLOR, JR., ALL OF SAME PLACE.

MEANS FOR TRANSMITTING POWER IN CABLE RAILWAYS.

SPECIFICATION forming part of Letters Patent No. 363,576, dated May 24, 1887.

Application filed February 7, 1887. Serial No. 226,742. (No model.)

*To all whom it may concern:*

Be it known that I, ROBERT S. BELISLE, of the city and county of Philadelphia, in the State of Pennsylvania, have invented certain new and useful Improvements in Means for Transmitting Power in Cable Railways, of which improvements the following is a specification.

The nature and object of my invention is to utilize simultaneously and continuously the propelling-power of the main cable or cables of traction-railways for imparting motion to short cables provided in curves, turn-outs, or sidings, whereby a car may be readily and quickly transferred by the grip-man in charge of the car from its main course around a curve or corner of thoroughfares—for instance, from an eastward or westward course to a northward or southward course, or onto a siding, if desired.

My invention will be more fully understood by reference to the accompanying drawings, forming part hereof, and to the description of the same, hereinafter set forth, and in which—

Figure 1 is a horizontal section through two conduits represented as running at right angles to each other, with their respective cables carried upon pulleys suitably supported therein, and showing one form of apparatus for propelling cars around curves or corners and the mechanism for simultaneously and continuously transmitting the power from the main cables thereto, and the means within man-holes for tightening the short cables whenever they may become slack from any cause whatsoever. Fig. 2 is a similar view showing the conduits running at right angles to each other, with their cables carried upon grooved traveling rollers suitably supported therein and the curved conduit or turn-out communicating therewith and forming part thereof with the cable traveling along horizontal pulleys held in bearings therein, and means for transmitting the power continuously to said short cable and for tightening the same. Fig. 3 is a similar view of a modified form of my invention, showing the mechanism for transmitting the power from the main cables to turn-outs and tension-wheels and their actuating mechanism for tightening said cables. Fig. 4 is a vertical section on the line *v v* of Fig. 1, showing the conduit, grooved wheels therein for carrying the turn-out cable, and a man-hole with a tension-wheel suitably supported therein, and mechanism for actuating the same for tightening the cable. Fig. 5 is a vertical section on the line *x x* of Fig. 1, showing the main conduit and man-hole communicating therewith, a double frictional wheel suitably supported therein for transmitting the power from the main cable to a turn-out cable, and the tension-wheel and its actuating mechanism for pressing the main cable against the double frictional wheels. Fig. 6 is a front elevation thereof. Fig. 7 is a vertical section on the line *y y* of Fig. 2, showing the main and turn-out conduits and man-hole, with the tension-wheel and mechanism for operating the same from the top of the man-hole. Fig. 8 is a front elevation thereof; and Fig. 9 is a front elevation on the line *z z* of Fig. 1, showing the main and turn-out cables traveling along over a series of grooved wheels, the double grooved frictional wheels for carrying the main and turn-out cables, and the grooved tension-wheel for tightening the same.

Referring to the drawings for a further description of my invention, A and A' are two main metallic conduits of any suitable construction and running, as shown in Figs. 1, 2, and 3, at right angles to each other, with their respective cables B and B' therein traveling over a series of pulleys, *b* and *b'*, suitably journaled to cross-rods $b^2$ and $b^3$, rigidly attached to the sides of the conduits A and A' and into the wall of the triangular-shaped metallic standard C, formed at the corner of the two thoroughfares.

D is a curved or corner turn-out conduit constructed of either forms shown in Figs. 1, 2, and 3, and wherein the short cable E is carried around the curve or corner on a series of horizontal grooved guide rollers, *d*, suitably journaled to cross-rods *e*, rigidly attached to the wall of the conduit D.

F and F' are doubled grooved frictional rollers journaled to cross-bars *f* and *f'*, rigidly held to the respective conduits, along and around which the main and turn-out cables are respectively carried, and the main cables imparting simultaneously and continuously positive motion to the turn-out cable by means of pressure-rollers, in a manner to be presently fully explained.

G and G' are man-holes, of any suitable construction, communicating with the main conduits A and A', respectively, forming a housing for the frictional pressure-rollers H and H'. These frictional pressure-rollers H and H' are supported within the man-holes G and G', having removable surface top plates, $g$, upon frame-work made of any suitable material, and each consisting of a standard, $h$, rigidly attached to the bottom of the housing G or G', with a cross-support, $h'$, rigidly fastened to the side walls of the respective man-holes, upon which cross support and standard is supported a horizontal table, $h^2$, provided with a dovetailed channel, $h^3$, therein for the slide $h^4$, provided with two threaded nuts, $h^5$ and $h^6$, rigidly secured to the top surface thereof, to move freely forward, or, when occasion may require, backward in this channel $h^3$, and to which slide $h^4$ is journaled one of the frictional pressure-rollers H or H'.

To the table $h^2$ is cast or otherwise rigidly secured a vertical projecting arm, $h^7$, for the reception of a worm-screw, $h^8$, journaled therein in any suitable manner, and along which screw the nuts $h^5$ and $h^6$ travel. To the worm-screw $h^8$, beyond where it is journaled in the vertical projecting arm $h^7$, is inserted a ratchet-wheel, $j'$, which is rigidly held thereto in any suitable manner. A locking-pawl, $j^2$, is attached to the vertical projecting arm $h^7$, a short distance above the ratchet-wheel $j'$, and is arranged so that it will engage in the teeth thereof. When the worm screw $h^8$ has been revolved by the crank $l$, attached to its extremity, the pressure-roller H or H' is brought more or less firmly against the main cable, causing the double frictional rollers F and F', respectively carrying the main and turn-out cables, to travel simultaneously and continuously through their respective conduits.

In Figs. 7 and 8 are shown another form for operating the respective frictional pressure-rollers H and H', held in the man-holes G and G' upon the frame-work, consisting of a standard, $h$, provided with a horizontal table having a groove or recess therein for the reception of the slide $h^4$, in which is journaled one of the frictional pressure-rollers H or H', and carrying upon its top surface two nuts having vertical tongues $h^9$, which slide in a narrow channel, $h^{10}$, formed in a horizontal bar, $h^{11}$, and with projecting end extremities, $h^{12}$ and $h^{13}$, one of which is secured to the table and the other free therefrom, and through both of which downward-projecting extremities of the horizontal bar $h^{11}$ is suitably journaled the worm-screw $h^8$, carrying a miter-wheel, $k$. Cast or otherwise secured to the horizontal bar $h^{11}$ is a bracket, $h^{14}$, which, with the table $h^2$, forms bearings for the shaft $j$, having securely fixed thereto a ratchet-wheel, $j'$, and a miter-wheel, $j^3$, which latter meshes with a similar wheel, $k$, rigidly attached to the worm-screw $h^8$.

Upon the top surface of the bracket $h^{14}$ is attached a locking-pawl, $j^2$, which engages in the teeth of the ratchet-wheel $j'$, firmly holding the same and preventing any return movement of the shaft, to which it is rigidly attached, when revolved by the crank $k'$, removable from the shaft $j$. This crank $k'$ is operated from the top of the man-hole G or G' for pressing the frictional roller H or H' more firmly against the main cables to increase the transmitting-power therefrom to the short cables of the turn-outs or sidings.

In man-holes M, communicating with the turn-out conduits D, are provided tension-wheels $m$, actuated by similar mechanism to that already described for transmitting simultaneously and continuously the power from the main cables to the turn-out cable for tightening this cable when it may become slack from any cause whatsoever.

While I have described the best means known to me at the present time for accomplishing my object, yet, nevertheless, I desire it to be distinctly understood that I do not wish to limit myself to the precise arrangement of mechanism hereinabove described for so doing, as it is manifestly obvious that the same may be altered without departing from the real spirit thereof; and hence,

Having thus described the nature and objects of my invention, what I claim as new, and desire to secure by Letters Patent, is—

1. In a cable railway, the combination of underground conduits, two main cables, a turn-out cable, two or more pressure-rollers, and their actuating devices, substantially as and for the purposes set forth.

2. In a cable railway, the combination of two main cables, a turn-out cable, frictional pressure-rollers, and mechanism, substantially as described, for actuating the same to permit the simultaneous and continuous transmission of the propelling-power of the main cables to the turn-out cable, and one or more tension-wheels with their actuating devices for tightening said turn-out cable, substantially as described.

3. In a cable railway, the combination, with two main cables running at right angles to each other over a series of guide-rollers suitably supported within underground conduits and a turn-out cable guided around a curve by a series of horizontal pulleys, of two or more double-grooved frictional wheels supported within the main conduits, one or more pressure-rollers, and means, substantially as described, for operating the same, and one or more tension-wheels, with their actuating devices, all arranged substantially as and for the purposes set forth.

In witness whereof I have hereunto set my hand in the presence of two subscribing witnesses.

ROBERT S. BELISLE.

Witnesses:
ANDREW ZANE, Jr.,
THOMAS M. SMITH.